United States Patent [19]
Koch et al.

[11] Patent Number: 4,635,351
[45] Date of Patent: Jan. 13, 1987

[54] METHOD AND MACHINE FOR PROVIDING ALTERNATOR POLE PIECES

[75] Inventors: Hubert H. Koch, Arcade; Edward F. Sargeaunt, Machias, both of N.Y.

[73] Assignee: Motorola, Inc., Schaumburg, Ill.

[21] Appl. No.: 500,122

[22] Filed: Jun. 1, 1983

[51] Int. Cl.$^4$ .......................... B21D 41/00; B21J 7/16
[52] U.S. Cl. ........................................ 29/598; 72/402
[58] Field of Search ................... 29/598; 72/336, 339, 72/379, 402; 310/257, 263

[56] References Cited

U.S. PATENT DOCUMENTS

| | | |
|---|---|---|
| 2,335,292 | 11/1943 | Messenger . |
| 2,343,253 | 3/1944 | Clark . |
| 2,839,697 | 6/1958 | Pierce et al. . |
| 3,370,450 | 2/1968 | Scheucher . |
| 3,374,651 | 3/1968 | Haug ............................... 72/402 X |
| 3,399,560 | 9/1968 | Connolly et al. . |
| 3,681,966 | 8/1972 | Uralowetz et al. ................... 72/402 |
| 3,769,696 | 11/1973 | Awano et al. . |
| 3,818,585 | 6/1974 | Preece . |
| 3,822,456 | 7/1974 | Petruzzi ............................ 72/402 X |
| 3,837,209 | 9/1974 | Guse ..................................... 72/402 |
| 4,038,860 | 8/1977 | Kanamaru et al. . |
| 4,117,793 | 10/1978 | Preece et al. . |

OTHER PUBLICATIONS

Verson, "The Ford Sandusky Project", Institute of Sheet Metal Engineering, Special Conference on Cold Extrusion of Steel, Nov. 2-4, 1965.

Primary Examiner—Howard N. Goldberg
Assistant Examiner—Timothy V. Eley
Attorney, Agent, or Firm—Phillip H. Melamed

[57] ABSTRACT

A method and machine for providing six point star shaped blanks of magnetic material which are then used to form a claw shaped alternator pole piece rotor member is disclosed. Magnetic material flat plate stock is flame cut into a zigzag strip and then individual hexagon shaped blanks are stamped out of the zigzag strip. While the hexagon blanks are contained between fixed parallel flat plates to insure predetermined thickness, six chisel point shaped tools are used to simultaneously laterally contact and cold form notched portions in each of the straight sides of the hexagon blank. Subsequently, while the notched blank is contained between parallel flat plates, six rounded point shaped tools simultaneously laterally contact the formed notched portions and cold form the blank into a desired six point star shape. The notching and forming are preferably accomplished by a machine which may comprise separate notching and forming work stations. After the star shaped blank is formed, a press is used to cold form the star shaped blank into an alternator pole piece claw having a main body with the star shaped projections bent by the press such that they project away from the main body in the same general direction. The press also at this time forms a center hole in the alternator pole piece claw main body.

20 Claims, 10 Drawing Figures

Fig. 1
PRIOR ART
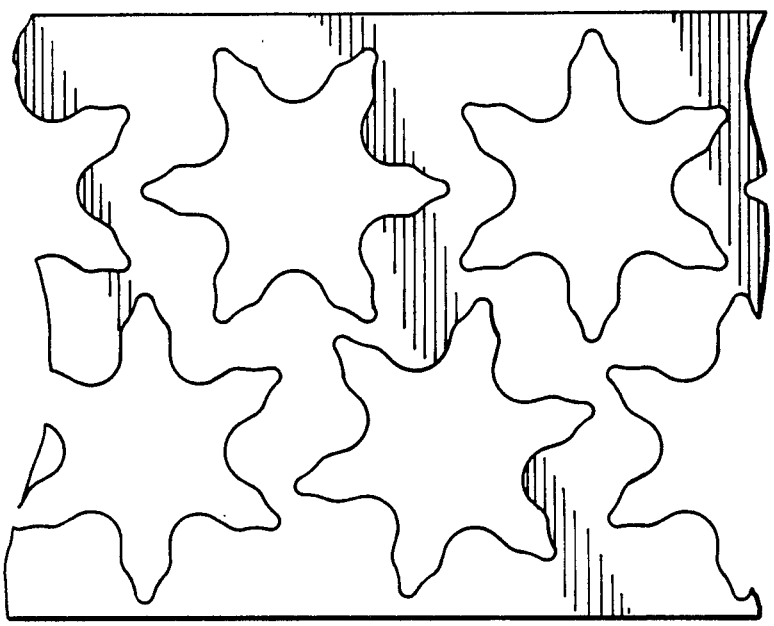
PRIOR ART
Fig. 2a
PRIOR ART
Fig. 2b
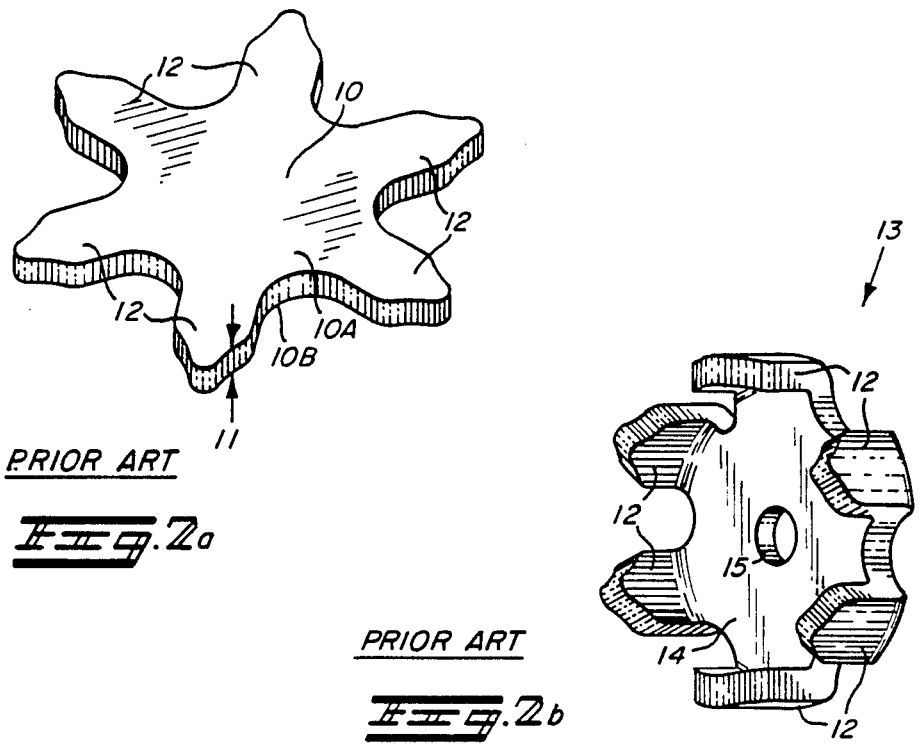

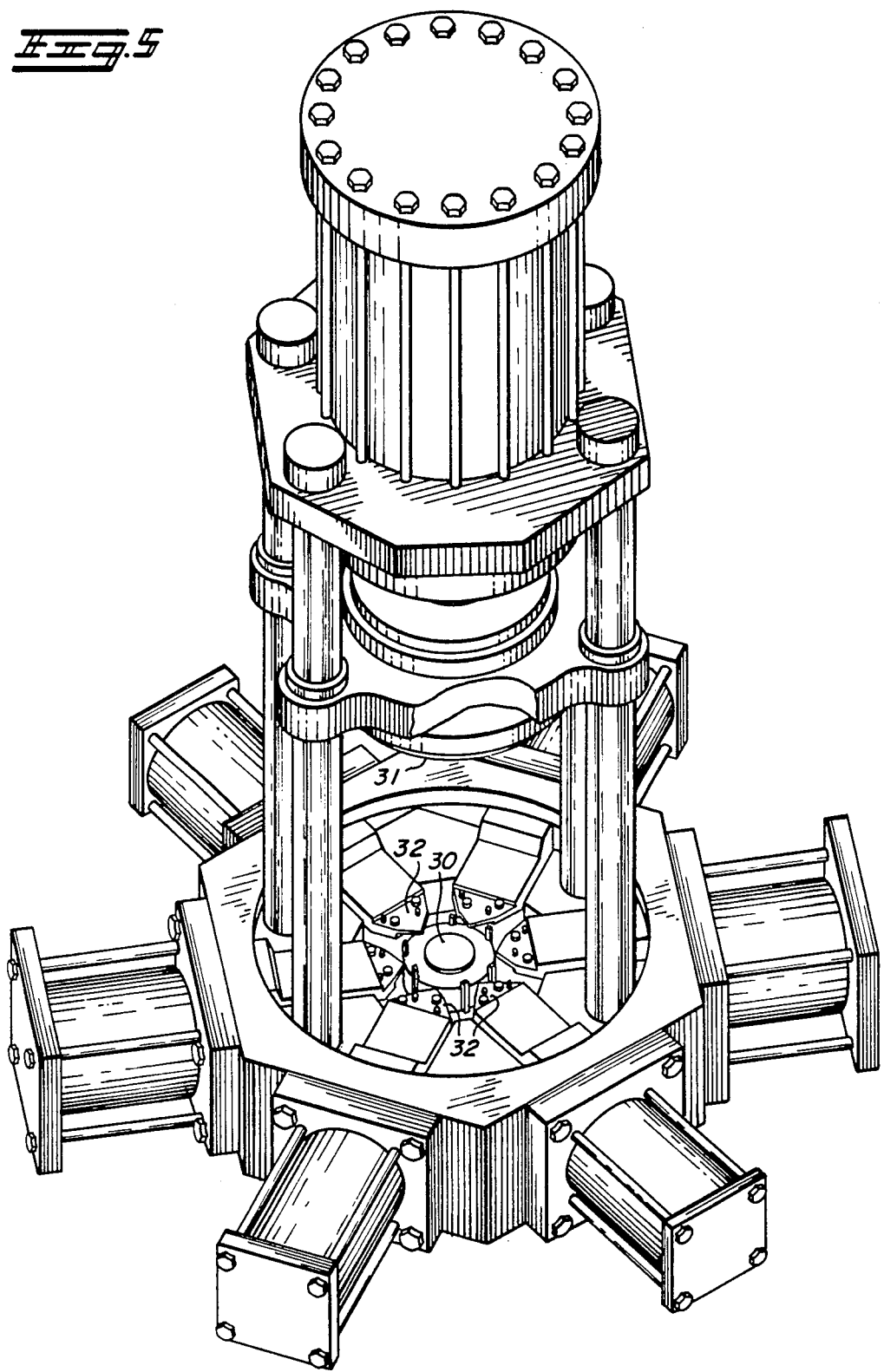

METHOD AND MACHINE FOR PROVIDING ALTERNATOR POLE PIECES

BACKGROUND OF THE INVENTION

The present invention generally relates to the field of providing alternator pole piece claw assemblies and more specifically to the providing of magnetic material star shaped blanks which may be formed into claw shaped alternator pole piece rotor assemblies.

There are many known techniques for the manufacture of alternator pole piece rotor claw assemblies. These claw assemblies are metallic, magnetic material assemblies substantially comprising a plurality of extending finger projections which extend from a substantially planar base plate having a through hole therein for through passage of the alternator rotating shaft. The rotor claw assembly is fixed to the alternator shaft for integral rotation therewith. The extending magnetic fingers of the claw assembly are intended for interdigitation with similar opposing claw pole fingers to form the standard interdigitated rotor claw pole configuration in common use today.

One prior technique of manufacturing such claw pole assemblies is to begin with a cylindrical slug of magnetic material which is then subjected to extreme pressures in order to extrude the material into the desired claw configuration. This type of process requires extremely expensive production equipment and subjects the magnetic material to extreme forming pressures.

Another prior method of forming the desired alternator claw pole piece configuration comprises stamping star shaped blanks from flat plate sheet stock of magnetic material. The star shaped, preferably a six point star, blanks are then cold formed by a press such that a center through hole is formed in the main claw planar body while the extending star fingers are bent to form projecting arms which project in the same direction away from the substantially planar main body of the claw pole piece. While this process minimizes the expenditure necessary for the required claw pole piece manufacturing equipment and also minimizes the pressures which must be applied to the magnetic material during the manufacture of the claw pole piece, the stamping out of the star shaped blanks from the magnetic material flat plate stock results in typically a more than 40% loss of the magnetic material plate stock. This loss of magnetic material results in an increase in the material cost for the resultant alternator claw pole piece.

SUMMARY OF THE INVENTION

An object of the present invention is to provide an improved method and machine for providing alternator pole pieces which overcomes the aforementioned deficiencies.

A more particular object of the present invention is to provide an improved method and machine for providing alternator pole pieces which minimizes the amount of lost magnetic material while also minimizing the cost of the required production equipment.

In one embodiment of the present invention, a method for providing an altenator pole piece is described comprising the steps of: forming at least one flat multi-straight sided polygon perimeter shaped flat plate blank from flat plate sheet stock of magnetic material, then notching a plurality of said perimeter straight sides of said polygon blank, then forming said notched polygon blank to create a star shaped perimeter blank useable as an alternator pole piece. Preferably the formed star shaped blank is used to form an alternator pole piece claw having a body with a plurality of arms projecting away therefrom in generally the same direction with respect to said body.

Preferably, a hexagon shaped blank is utilized and the steps of notching the perimeter straight sides of the hexagon blank and subsequently forming the notched sides to create a star shaped perimeter blank are performed by a machine through the use of six hydraulically operated chisel point shaped tools which simultaneously contact and notch the perimeter straight sides of the hexagon blank and then through the use of six rounded point shaped tools which subsequently form the notched portions of the blank so as to provide the star shaped blank. During the notching and star shape forming operations the blank is contained between fixed flat parallel plates to control the thickness of the blank, the parallel plates contacting the blank and restricting the thickness growth of the blank during the notching and forming operations. Both the notching and star shaped forming operations are cold form metal operations.

By starting with a hexagon shaped blank, the amount of lost magnetic material is minimized since stamping hexagon shaped blanks from flat plate stock can be accomplished with a minimum of waste of material. The subsequent notching and cold forming operations used to form the hexagon shaped blank into the desired star shape can be accomplished with substantially less expensive production equipment due to the fact that substantially smaller pressures are required for these steps as compared to the prior art claw pole extrusion manufacturing method. After the star shaped blank has been formed, it is contemplated that standard cold form press techniques are utilized to bend the extending star finger projections in the same direction and form a central through hole in the main claw body so as to arrive at the desired alternator pole piece claw shape.

BRIEF DESCRIPTION OF THE DRAWINGS

For a more complete understanding of the present invention, reference should be made to the drawings, in which:

FIG. 1 is a planar view of magnetic material flat plate sheet stock which has been punched (stamped) according to prior art techniques to form star shaped blanks;

FIGS. 2a and 2b comprise perspective views illustrating the stamped planar star shaped blank and its subsequent prior art cold form press formation into the desired alternator pole piece claw shape;

FIG. 5 is a perspective view of the work station of a machine having chisel point tools inserted for notching the blanks shown in FIG. 4a.

DESCRIPTION OF THE PREFERRED EMBODIMENT

Figure 3:
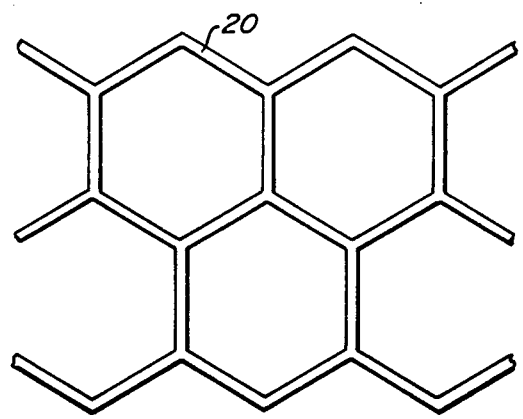
FIG. 3 is a planar view of a strip of magnetic material flat plate sheet stock which has been punched to provide desired hexagon shaped blanks.

Referring to FIG. 1, the prior art technique of directly stamping a star shaped flat plate blank from magnetic material flat plate sheet stock is illustrated. The term "flat plate" as used herein refers to solid material comprising external parallel plate surfaces separated from each other by a desired substantially uniform thickness dimension, typically 0.3 to 0.4 inches. As can be seen, due to the star shape of the desired blank configuration, a substantial amount of magnetic material is wasted when such star shaped blanks are stamped from flat plate sheet stock. The present invention overcomes this through the use of a hexagon shaped flat plate blank which is then subsequently formed into the desired star shaped blank.

The desired end result star shaped blank, regardless of whether it is produced by the prior art method or the present invention, is illustrated in FIG. 2a as the substantially flat plate star shaped blank 10. The blank comprises six laterally projecting star finger projections all essentially coplanar resulting in a flat plate star shaped perimeter blank of magnetic material having a substantially uniform thickness 11. The blank 10 has top and bottom major parallel surfaces 10A and 10B. It is contemplated that the star shaped blank 10 is then preferably ground to a precise desired thickness, dipped in a phosphate solution whereby iron phosphate is deposited on the external surface of the blank 10 as a lubricant, and then the blank 10 is cold formed by a press into the prior art claw pole piece configuration 13 illustrated in FIG. 2b. The cold form press forming the claw pole configuration 13 essentially bends the star finger projections 12 such that they project away from a main planar body 14 of the claw pole piece 13 wherein during the cold forming operation a center through hole 15 is provided in the main body 14. The purpose of the through hole 15 is to receive the alternator shaft since the claw pole piece 13 will be mounted thereon for integral rotation therewith as part of the alternator rotor. The press utilized to form the star shaped blank 10 into the claw pole piece 13 is known and essentially involves standard cold form material operations. After the claw pole piece configuration 13 is obtained, then the pole piece is cleaned and annealed to form the finished claw shaped pole piece assembly. Such assemblies are in common use in the construction of alternator rotor assemblies and comprise two interdigitated claw shaped rotor pole pieces.

Figure 4A:
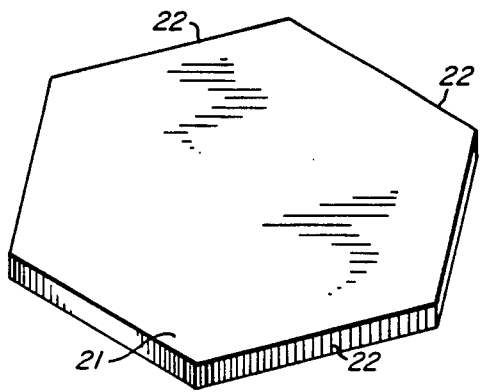
FIGS. 4a–4c comprise a series of three planar views illustrating the forming of a hexagon shaped blank of magnetic material, stamped out of sheet stock as shown in FIG. 3, into a desired star shaped blank of magnetic material.
Figure 4B:
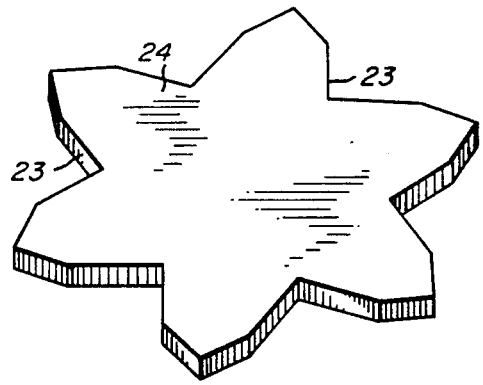
Figure 4C:
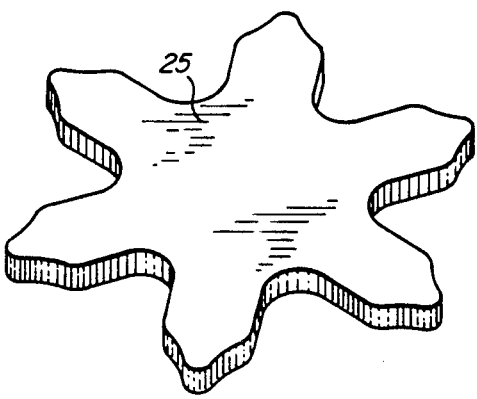

As was noted previously, the present invention relates to an improved and more efficient method and a machine which utilizes this method to form the star shaped blank 10 which is used to form the claw pole piece 13. The improved method of the present invention initially starts with forming a zigzag strip 20 of magnetic material flat plate sheet stock shown in FIG. 3 wherein perferably the zigzag strip 20 is formed by flame cutting flat plate sheet stock of magnetic material. Subsequently, a standard punch press is utilized to stamp out hexagon perimeter shaped flat plate blanks from the zigzag strip 20 as shown in FIG. 3. One of these hexagon (multi-straight sided polygon) perimeter shaped blanks is illustrated in FIG. 4a as flat plate blank 21. The blank 21 comprises six perimeter (lateral) straight sides 22, and the present invention comprises notching each one of these perimeter straight sides so as to form a lateral notched portion 23 in each straight side thereby arriving at the interim notched flat plate blank 24 illustrated in FIG. 4b. The present invention then comprises forming each of the lateral notched portions 23 of the interim blank 24 so as to arrive at the desired star shaped perimeter blank 25 illustrated in FIG. 4c which substantially corresponds to the blank 10 shown in FIG. 2. The manner in which the hexagon shaped blank 21 is processed so as to arrive at the star shaped blank 25 will now be discussed in detail.

It is contemplated that each hexagon shaped blank 21 will be placed in a machine work station such as that shown in FIG. 5 wherein the work station comprises a fixed base flat plate 30 with a hydraulically operated parallel top plate 31 intended for downward movement into a fixed position so as to contain the blank 21, which will be effectively held parallel to the plates 30 and 31, between the fixed plates 30 and 31 during the notching and forming operations which will take place. By containing the blank during these operations, which are preferably cold forming operations, this insures a predetermined thickness for the formed blank after the notching and forming steps with the parallel plates contacting the blank and restricting the thickness growth of the blank during the notching and forming operations. The plates 30 and 31 contain the hexagon blank during the notching operation by remaining a fixed distance apart which distance is slightly larger than the maximum thickness of the stamped hexagon blank. During the notching operation the blank will tend to grow in thickness, but the plates 30 and 31 will remain fixed and contact the blank and restrict its thickness to a predetermined maximum thickness equal to the spacing between the plates 30 and 31. The plates function similarly during the forming operation.

As illustrated in FIG. 5, the work station shown is provided with six removable chisel point shaped tools 32 which are intended for simultaneous inward lateral contacting movement, preferably driven by hydraulic control, so as to simultaneously cold form notch each of the lateral straight sides 22 of the hexagon shaped blank 21 thus forming the interim blank 24.

Figure 6A:
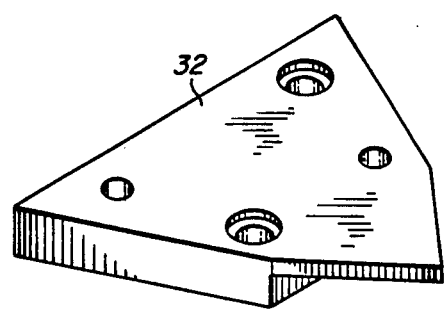
FIGS. 6a and 6b comprise perspective views illustrating one of the chisel point tools in FIG. 5 and a rounded point tool which can be utilized with the work station shown in FIG. 5 to form the notched blank shown in FIG. 4b into the star shaped blank shown in FIG. 4c.
Figure 6B:
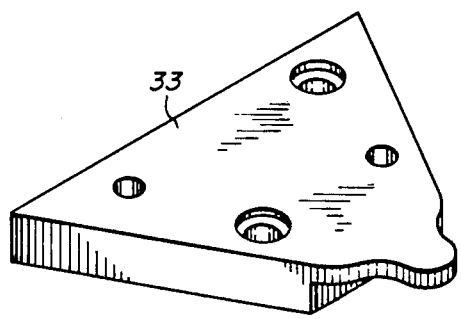

After the forming of the interim blank 24, the blank 24 will be moved to another similar work station wherein rounded point shaped tools, such as the tool 33 shown in FIG. 6b, will replace the chisel point tool 32, or the work station shown in FIG. 5 will be modified such that the six chisel point tools 32 will be removed and replaced by six rounded point tools 33. In either event the next step of the present invention comprises laterally simultaneously contacting the formed notch portions 23 in the interim blank 24 with rounded point shaped tools 33 so as to form the desired star shaped blank 25. Preferably the chisel point tools and rounded point tools simultaneously contact substantially opposing perimeter sides of the blank to equalize the stress forces applied during the cold forming operations. The term "laterally contacting" as used herein refers to centrally inward linear driving movement of the chisel or rounded tools parallel to the top and bottom parallel surfaces 10A and 10B of the blank from a first position laterally beyond the perimeter of the blank to a second position with the tools in contact with the perimeter edges of the blank. The machine work station in FIG. 5 can accomodate either of the tools 32 or 33 which can be mounted therein, and the operations of the present invention can be carried out such that a hexagon shaped blank 21 can be cold formed to provide a star shaped blank 25.

Preferably the present invention also includes a "coining" step in which tools substantially identical to the round point tool 33 are utilized in the work station shown in FIG. 5 to further form the roughly star shaped blank 25 into its final desired end star shape. The "coining" operation can comprise merely a restrike with exactly the same tools 33 used for the initial star forming operation which produced the blank 25, or a slightly modified tool shape may be utilized to eliminate any magnetic material flashing which occurs during the notching and/or initial star forming operation. It should also be noted that preferably some suitable locating mechanism such as spring finger mechanisms or locating pins in the plates 30 and/or 31, would initially orientate the hexagon blank 21 in the work station shown in FIG. 5. However, after the initial notching operation, it is contemplated that the subsequent round point shaped tool forming operation would essentially be self locating.

While we have described a specific embodiment of the present invention, further modifications and improvements will be apparent to those of skill in the art. All such modifications which retain the basic and underlying principles disclosed and claimed herein are within the scope of the present invention. Such modifications could comprise automatic conveyer mechanisms such that a single machine would sequentially flame cut the zigzag strip 20, punch out the hexagon blank 21, sequentially load the blank 21 into a first work station which forms the interim blank 24, and then sequentially load the interim blank 24 into a second work station which forms the desired star shaped blank 25. In any event, the end result is the desired star shaped blank 25 which, according to known techniques, can be cold formed by known equipment into a desired magnetic claw pole piece rotor configuration. Through the use of the techniques of the present invention, an inexpensive cold form manufacturing machine has been provided which allows the use of initial hexagon shaped flat plate blanks to form desired star shaped magnetic material blanks needed for the forming of a claw pole piece, and the utilization of the hexagon shaped initial blanks results in a substantial saving of costly magnetic material.

We claim:

1. A method for forming an alternator pole piece comprising the steps of:
    forming at least one integral, solid, flat plate multi-straight sided polygon perimeter shaped flat plate blank from flat plate sheet stock of magnetic material, then
    notching said perimeter straight sides of said polygon blank to form notched portions of said straight sides by laterally simultaneously contacting each of said perimeter straight sides by chisel point shaped tools, and then
    forming said notched polygon blank to create a star shaped perimeter flat plate blank usable in providing an alternator pole piece.

2. A method for forming an alternator pole piece according to claim 1 which includes the step of, during at least one of said notching and forming steps, containing said blank between fixed parallel flat plates which are substantially parallel to said blank and wherein said plates contact said blank during said one of said steps to provide a predetermined thickness for said blank after said steps.

3. A method for forming an alternator pole piece according to the method of claim 1 wherein said star shaped forming step comprises cold forming the notched blank to provide said star shaped perimeter blank.

4. A method for forming an alternator pole piece according to claim 1 wherein said star shaped forming step comprising laterally simultaneously contacting said formed notched portions in said blank with rounded point shaped tools.

5. A method for forming an alternator pole piece according to claim 4 (wherein said star forming step comprises cold forming said blank by said rounded point shaped tools.

6. A method for forming an alternator pole piece according to claim 5 wherein said star forming step includes containing said blank between fixed flat parallel plates to control the thickness of said blank while said rounded point shaped tools contact said formed notched portions and said blank contacts said plates.

7. A method for forming an alternator pole piece according to claim 6 wherein said notching step includes containing said blank between fixed flat parallel plates to control the thickness of said blank while said chisel point tools form said notched portions and said blank contacts said plates.

8. A method for forming an alternator pole piece according to claim 7 wherein said polygon shaped blank has a hexagon shape.

9. A method according to claim 8 wherein said star forming step includes the step of coining which involves again contacting said notched portions with substantially identically shaped rounded point shaped tools after initially contacting said notched portions with rounded point shaped tools.

10. A method for forming an alternator pole piece according to claim 1 wherein said notching step includes containing said blank between fixed flat parallel plates to control the thickness of said blank while said chisel point tools form said notched portions and said blank contacts said plates.

11. A method for forming an alternator pole piece according to claim 1 which includes the step of utilizing said formed star shaped blank to form an alternator pole piece rotor claw having a main body and a plurality of arms projecting away therefrom in generally the same direction with respect to said body, and wherein said utilizing step comprises bending outward projections of said star shaped blank in order to form said alternator pole piece claw.

12. A method for forming an alternator pole piece according to claim 1 which includes the step of forming said at least one flat plate multi-straight sided polygon perimeter shaped flat plate blank from flat plate sheet stock of magnetic material.

13. A machine for forming an alternator pole piece comprising:
    means for receiving at least one integral, solid, flat plate multi-straight sided polygon perimeter shaped blank made from flat plate sheet stock of magnetic material;
    means for notching said perimeter straight sides of said polygon blank to form notched portions of said straight sides by laterally simultaneously contacting each of said perimeter straight sides by chisel point shaped tools, said notching means also including means for containing the blank to control the thickness of the blank; and means for forming each of said notched polygon blanks to create pointed star shaped perimeter blanks.

14. A machine according to claim 13 wherein said forming means comprises means for laterally simultaneously contacting said formed notched portions in said blank with rounded point shaped tools.

15. A machine according to claim 14 wherein said forming means comprises means for cold forming said blank by use of said rounded point shaped tools.

16. A machine according to claim 15 wherein said forming means includes means for containing said notched blank between fixed flat parallel plates to control the thickness of said blank while said rounded point shaped tools contact said formed notched portions and said blank contacts said plates.

17. A machine according to claim 16 wherein said notching means includes means for containing said blank between fixed flat parallel plates while said chisel point shaped tools form said notched portions and said blank contacts said plates.

18. A machine according to claim 17 wherein said polygon blank has a hexagon shape.

19. A machine according to claim 18 wherein said forming means includes means for contacting said notched portions with substantially identically shaped rounded point shaped tools after the initial contact of said notched portions with rounded point shaped tools.

20. A machine according to claim 15 wherein said means for containing said blank are fixed flat parallel plates.

* * * * *

UNITED STATES PATENT AND TRADEMARK OFFICE
CERTIFICATE OF CORRECTION

PATENT NO. : 4,635,351

DATED : January 13, 1987

INVENTOR(S) : Hubert H. Koch and Edward F. Sargeaunt

It is certified that error appears in the above-identified patent and that said Letters Patent is hereby corrected as shown below:

Claim 5, column 6, line 12, please delete "(".

Claim 20, column 8, line 13, please delete "15" and insert --13--.

Signed and Sealed this

Eleventh Day of August, 1987

Attest:

DONALD J. QUIGG

Attesting Officer

Commissioner of Patents and Trademarks